United States Patent
Auerbach et al.

(10) Patent No.: US 10,723,214 B2
(45) Date of Patent: Jul. 28, 2020

(54) DRIVE DEVICE FOR A MOTOR VEHICLE

(71) Applicant: AUDI AG, Ingolstadt (DE)

(72) Inventors: Michael Auerbach, Ingolstadt (DE); Johannes Brunner, Neuburg a.d. Donau (DE); Stefan Weinzierl, Kösching (DE)

(73) Assignee: AUDI AG, Ingolstadt (DE)

( * ) Notice: Subject to any disclaimer, the term of this patent is extended or adjusted under 35 U.S.C. 154(b) by 55 days.

(21) Appl. No.: 15/909,184

(22) Filed: Mar. 1, 2018

(65) Prior Publication Data
US 2018/0251017 A1    Sep. 6, 2018

(30) Foreign Application Priority Data
Mar. 1, 2017    (DE) .......................... 10 2017 203335

(51) Int. Cl.
| | |
|---|---|
| *B60K 6/36* | (2007.10) |
| *F16H 3/089* | (2006.01) |
| *B60K 6/387* | (2007.10) |
| *B60K 6/40* | (2007.10) |
| *B60K 6/442* | (2007.10) |
| *B60K 6/547* | (2007.10) |

(Continued)

(52) U.S. Cl.
CPC ............... *B60K 6/36* (2013.01); *B60K 6/387* (2013.01); *B60K 6/40* (2013.01); *B60K 6/442* (2013.01); *B60K 6/48* (2013.01); *B60K 6/547* (2013.01); *B60W 10/02* (2013.01); *F16D 21/02* (2013.01); *F16F 15/13121* (2013.01); *F16H 3/089* (2013.01); *Y02T 10/6234* (2013.01)

(58) Field of Classification Search
CPC .. F16H 3/089; B60K 6/36; B60K 6/48; B60K 6/547; B60K 6/442; B60K 6/40; B60K 6/387; Y02T 10/6234

USPC .................................. 74/325, 329, 330, 331
See application file for complete search history.

(56) References Cited

U.S. PATENT DOCUMENTS

| | | |
|---|---|---|
| 5,433,382 A | 7/1995 | Baumgarten et al. |
| 6,024,667 A | 2/2000 | Krohm et al. |
| 7,125,362 B2 | 10/2006 | Beaty et al. |

(Continued)

FOREIGN PATENT DOCUMENTS

| | | |
|---|---|---|
| DE | 102016111840 A1 | 12/2016 |
| EP | 1 122 110 A2 | 8/2001 |
| WO | 2017/056813 A1 | 4/2017 |

OTHER PUBLICATIONS

Examination Report dated Nov. 15, 2017 of corresponding German application No. 10 2017 203 335.5; 10 pgs.

(Continued)

*Primary Examiner* — Roger L Pang
(74) *Attorney, Agent, or Firm* — Maier & Maier, PLLC

(57) ABSTRACT

A drive device for a motor vehicle, having a first drive assembly, a second drive assembly that can be coupled to the first drive assembly with a fixed transmission ratio by an intermediate clutch, as well as a driven shaft that can be coupled to the first drive assembly and to the second drive assembly. Here, the first drive assembly is directly coupled or can be coupled to a third drive assembly, and that the driven shaft can be coupled to the second drive assembly, on the one hand, by way of a first shift clutch and a first transmission stage, and, on the other hand, by way of a second shift clutch, which is coupled to the second drive assembly parallel to the first shift clutch, and a second transmission stage.

8 Claims, 1 Drawing Sheet

(51) Int. Cl.
*B60K 6/48* (2007.10)
*B60W 10/02* (2006.01)
*F16D 21/02* (2006.01)
*F16F 15/131* (2006.01)

(56) References Cited

U.S. PATENT DOCUMENTS

| | | | |
|---|---|---|---|
| 7,604,565 B2* | 10/2009 | Lee | B60K 6/36 |
| | | | 477/3 |
| 9,050,881 B2* | 6/2015 | Piazzolla | B60K 6/383 |
| 9,340,101 B2 | 5/2016 | Meißner et al. | |
| 9,370,993 B2 | 6/2016 | Chen et al. | |
| 2001/0042647 A1* | 11/2001 | Sakamoto | B60K 6/442 |
| | | | 180/65.23 |
| 2002/0000132 A1* | 1/2002 | Sakamoto | B60K 6/48 |
| | | | 74/325 |
| 2002/0098941 A1* | 7/2002 | Minowa | B60L 50/16 |
| | | | 477/5 |
| 2004/0147365 A1* | 7/2004 | Komeda | B60K 6/442 |
| | | | 477/6 |
| 2009/0048747 A1 | 2/2009 | Stridsberg | |
| 2011/0233020 A1* | 9/2011 | Tajima | B60K 6/387 |
| | | | 192/48.8 |
| 2012/0053011 A1 | 3/2012 | Onomura et al. | |
| 2012/0208671 A1 | 8/2012 | Zhu et al. | |
| 2015/0040719 A1* | 2/2015 | Kim | B60K 6/547 |
| | | | 74/661 |
| 2016/0090076 A1* | 3/2016 | Tsuji | B60K 6/48 |
| | | | 477/5 |
| 2016/0137045 A1 | 5/2016 | Zhu et al. | |
| 2019/0270371 A1* | 9/2019 | Scholle | B60K 6/48 |

OTHER PUBLICATIONS

European Search Report dated Apr. 30, 2018, in connection with corresponding EP Application No. 18157069.8 (8 pgs.).

* cited by examiner

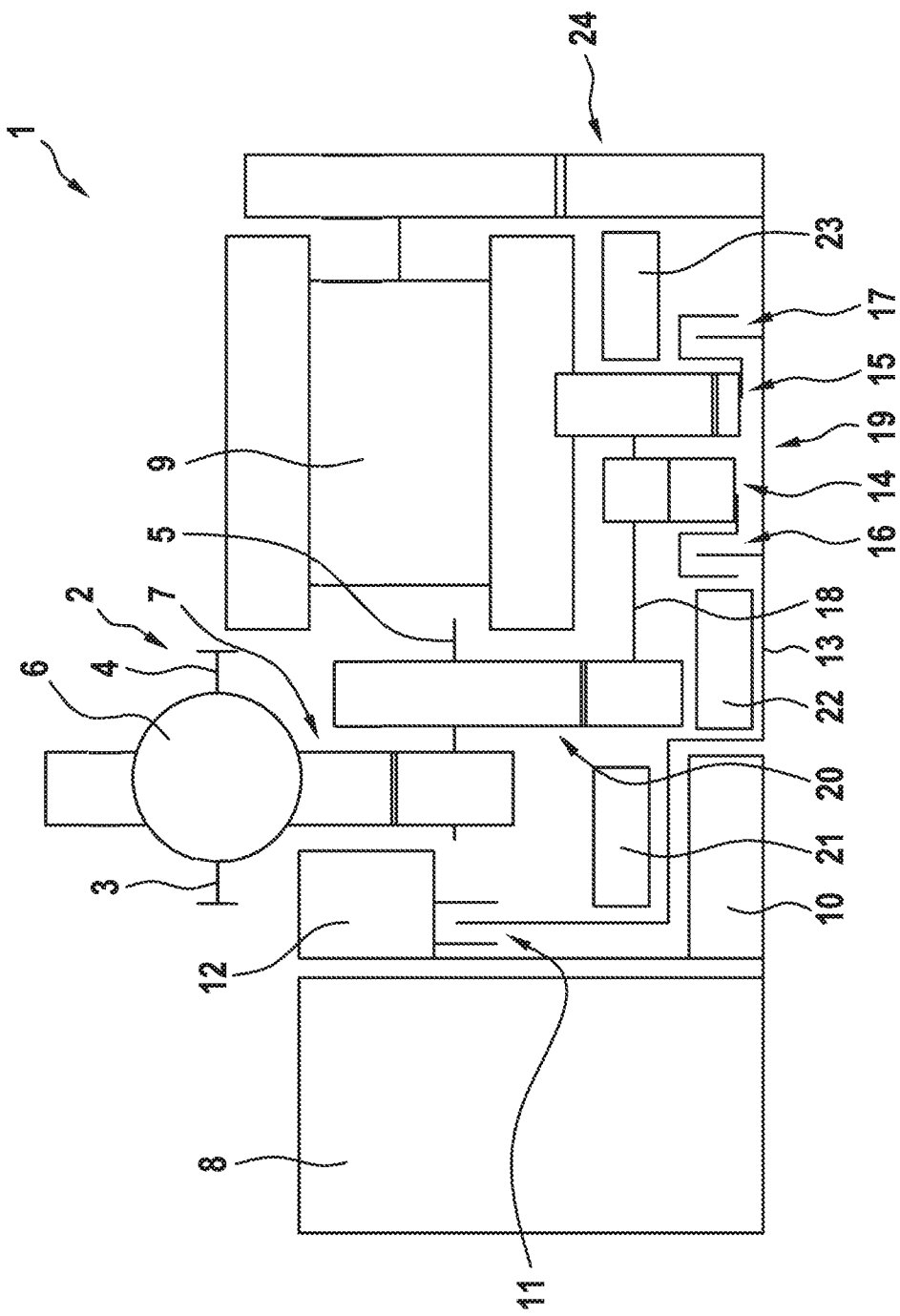

DRIVE DEVICE FOR A MOTOR VEHICLE

FIELD

The invention relates to a drive device for a motor vehicle, having a first drive assembly, a second drive assembly that can be coupled to the first drive assembly with a fixed transmission ratio by means of an intermediate clutch, as well as a driven shaft that can be coupled to the first drive assembly and to the second drive assembly, respectively.

BACKGROUND

The drive device serves for driving the motor vehicle, thus in this regard, supplying a torque directed at driving the motor vehicle. The torque is supplied by the drive device to the driven shaft, which is coupled to at least one driven or drivable wheel, respectively, of the motor vehicle. The operative connection between the driven shaft and the at least one wheel may be present as basically rigid, and/or permanent or only temporary by way of a shift clutch. Preferably, the driven shaft is coupled, more preferably permanently coupled, to one wheel axle of the motor vehicle or to a plurality of wheels provided on this wheel axle, respectively, in particular, by way of at least one differential.

The drive device provides a plurality of drive assemblies, i.e., at least the first drive assembly and the second drive assembly. Both the first drive assembly and the second drive assembly can each be coupled to the driven shaft. Also, an intermediate clutch is provided between the first drive assembly and the second drive assembly, the two drive assemblies being able to be coupled to each other by means of this clutch. In a first shift position of the intermediate clutch, an operative connection is present between the first drive assembly and the second drive assembly; in this regard, in particular, the first drive assembly and the second drive assembly are rigidly coupled to one another. In a second shift position of the intermediate clutch, in contrast, the first drive assembly and the second drive assembly are decoupled from one another, in particular, completely decoupled from one another.

Preferably, the driven shaft can be separately coupled to the second drive assembly, whereas the coupling of the driven shaft to the first drive assembly is possible exclusively together with the second drive assembly and/or by way of the second drive assembly. In this regard, the driven shaft is either coupled to the second drive assembly while it is decoupled from the first drive assembly, or it is coupled to both the first drive assembly and also to the second drive assembly. The torque supplied to the driven shaft is thus either supplied by the second drive assembly alone, or by both the first drive assembly and the second drive assembly together.

SUMMARY

The object of the invention is to provide a drive device for a motor vehicle, which has advantages when compared to known drive devices, in particular makes possible a flexible use with little expense.

Here, it is provided that the first drive assembly is coupled or can be coupled directly to a third drive assembly, and that, on the one hand, the driven shaft can be coupled to the second drive assembly by way of a first shift clutch and a first transmission stage, and, on the other hand, by way of a second shift clutch parallel to the first shift clutch and coupled to the second drive assembly as well as a second transmission stage.

Therefore, the third drive assembly is provided in addition to the first drive assembly and the second drive assembly. The third drive assembly is directly coupled, or at least can be coupled, to the first drive assembly, in particular rigidly and/or permanently. In the latter case, for example, a clutch, in particular a shift clutch or an overrunning or freewheeling clutch is arranged between the first drive assembly and the third drive assembly, so that the first drive assembly is only temporarily coupled to the third drive assembly. The third drive assembly can be coupled to the driven shaft analogously to the first drive assembly only by way of the second drive assembly, but preferably exclusively together with the first drive assembly. Therefore, it is not provided that the third drive assembly can be coupled to the driven shaft separately from the first drive assembly.

In addition, it is provided that the second drive assembly can be coupled or is coupled to the second drive assembly by way of several transmission stages and shift clutches. The plurality of transmission stages is understood to be at least the first transmission stage and the second transmission stage; the plurality of shift clutches is understood to be the first shift clutch and the second shift clutch. Preferably, the operative connection between the second drive assembly and the driven shaft can be produced exclusively by way of the first transmission stage and the second transmission stage. In addition to these two transmission stages, no additional transmission stages are thus provided, and in particular, there are no transmission stages arranged parallel to these transmission stages.

The two shift clutches are coupled, on the one hand, to the second drive assembly, and, on the other hand, to the driven shaft, preferably rigidly and/or permanently in each case. An input side of the first shift clutch and an input side of the second shift clutch are thus coupled to the second drive assembly, that is, preferably rigidly and/or permanently coupled. An output side of the first shift clutch is coupled to the first transmission stage, which in turn is coupled to the driven shaft on its side facing away from the first shift clutch, whereby the particular coupling is executed preferably rigidly and/or permanently. The same applies to the second shift clutch, whose output side is coupled to the driven shaft by way of the second transmission stage, that is, preferably also rigidly and/or permanently coupled. In other words, a two-speed dual clutch transmission is realized between the second drive assembly and the driven shaft.

The two shift clutches or their input sides, respectively, are coupled to the second drive assembly parallel to one another. Correspondingly, the operative connection between the second drive assembly and the driven shaft can be produced as desired by way of either the first shift clutch and the first transmission stage or the second shift clutch and the second transmission stage. The two transmission stages therefore have different transmission ratios from one another. Of course, the two shift clutches can both be opened or disengaged, so that the operative connection between the second drive assembly and the driven shaft is interrupted.

Overall, it is shown that the first drive assembly as well as the third drive assembly can be coupled to the shift clutches or their input sides, respectively, only by way of the intermediate clutch, and preferably, additionally by way of the second drive assembly. However, it can also be provided that the input sides of both shift clutches are present on a common intermediate shaft, at which the intermediate clutch, on the one hand, and the second drive assembly, on the other hand, are arranged.

A flexible driving operation of the motor vehicle can be realized with such a configuration of the drive device, with minimum expenditure, in particular with respect to the necessary components, structural or packing space, costs, weight and complexity. This particularly applies when the first drive assembly is configured as an internal combustion engine, and the second drive assembly is configured as an electric machine. A driving experience like that with a purely electric vehicle can be mediated thereby over a broad speed range for a driver. For a travel speed above the speed range, only a change of gear need be carried out with the help of the shift clutches. Also, the expense for developing such a drive device can be kept small, since the two shift clutches can be taken from existing dual clutch transmissions.

Another configuration of the invention provides that the second drive assembly is coupled via a gear transmission stage having a common transmission input shaft for the first transmission stage and the second transmission stage. The transmission input shaft here represents the input shaft of the dual clutch transmission. The second drive assembly is coupled, preferably rigidly and/or permanently, to the transmission input shaft via the gear transmission stage. The gear transmission stage has at least two gears, in particular precisely two gears, one of which is coupled to the second drive assembly, and the other of which is coupled to the transmission input shaft, preferably rigidly and/or permanently. The gears are designed, for example, as spur or helical gears.

Another embodiment of the invention provides that the driven shaft is coupled to a common transmission output shaft of the first transmission stage and the second transmission stage. This coupling is also realized preferably rigidly and/or permanently. The transmission output shaft represents the output shaft of the dual clutch transmission. Here, each of the two transmission stages has a gear that is disposed on the transmission output shaft or is joined to it in a rotation-resistant manner.

A preferred embodiment of the invention provides that the driven shaft is coupled to the transmission output shaft by way of another gear transmission stage. The additional gear transmission stage preferably has a ratio that differs from one, so that during an operation of the drive device, the driven shaft has a rotational speed that is different from the rotational speed of the transmission output shaft. The coupling of the driven shaft to the transmission output shaft is provided by way of the additional gear transmission stage, preferably rigidly and/or permanently.

An enhancement of the invention provides that the first drive assembly and the intermediate clutch or the intermediate clutch and the second drive assembly are joined together by way of a vibration absorber. The vibration absorber serves for damping vibrations of the first drive assembly and/or the third drive assembly. The vibration absorber preferably has a dual mass flywheel and/or a centrifugal pendulum.

Within the scope of a preferred embodiment of the invention, it is provided that the intermediate clutch is configured as integrated with the vibration absorber. The packing space requirement of the drive device can be further reduced with such an integrated embodiment of the intermediate clutch and vibration absorber. For example, the intermediate clutch is arranged in the radial direction relative to an axis of rotation of the vibration absorber or the intermediate clutch, respectively, on the inside of the vibration absorber, so that the intermediate clutch and the vibration absorber are arranged in an overlapping way, when viewed in the axial direction.

Another preferred embodiment of the invention provides that the second drive assembly has a rated power of the same order of magnitude as the first drive assembly. The phrase "order of magnitude" can be evaluated according to the usual mathematic definition. Alternatively, the same order or magnitude of the rated powers of the first drive assembly and the second drive assembly can be understood in that the rated power of the second drive assembly has at least 50%, at least 60%, at least 70%, at least 75%, at least 80%, at least 90%, or at least 95% and/or at most 105%, at most 110%, at most 120%, at most 125%, at most 130%, at most 140%, or at most 150% of the rated power of the first drive assembly. Alternatively, however, the rated power of the second drive assembly can also be greater than 150% or greater than 200% of the rated power of the first drive assembly. It is particularly important that the second drive assembly has a defined minimum rated power that is of the same order of magnitude as the first drive assembly.

Another preferred embodiment of the invention provides that the third drive assembly has a lower rated power than the second drive assembly. The third drive assembly is configured, for example, as an electric machine and can serve as a starter for the first drive assembly. In this regard, the required rated power of the third drive assembly is lower than the rated power of the second drive assembly, so that it can be configured smaller or with lower rated power.

A preferred embodiment of the invention provides that the first drive assembly is configured as an internal combustion engine and/or the second drive assembly and/or the third drive assembly is (are) configured as an electric machine. An embodiment of this kind was already pointed out above. Basically, the drive assemblies can be designed as desired. The advantages stand out particularly clearly, however, when the first drive assembly is configured as an internal combustion engine, and both the second drive assembly and the third drive assembly are each present as an electric machine.

Finally, in the scope of another preferred embodiment of the invention, it can be provided that the first drive assembly and/or the second drive assembly and/or the third drive assembly is (are) arranged axis-parallel or coaxial to one another. In other words, at least two of the drive assemblies, which comprise the first drive assembly, the second drive assembly, and the third drive assembly are arranged axis-parallel or coaxial to one another. More preferably, this applies to all of the named drive assemblies. Such a configuration makes possible a particularly space-saving embodiment of the drive device.

The invention will be explained in further detail in the following on the basis of the exemplary embodiments shown in the drawing, without resulting in any limitation of the invention. The single FIGURE shows here:

FIG. 1 shows a schematic representation of a drive device for a motor vehicle that makes available a plurality of drive assemblies.

FIG. 1 shows a schematic representation of a region of a drive device 1 that serves for driving a wheel axle 2 of a motor vehicle, which is not shown in more detail. The wheel axle 2 has two axle members 3 and 4 that are coupled to a driven shaft 5 of the drive device 1, in particular rigidly and/or permanently. The axle members 3 and 4 are preferably coupled to the driven shaft 5 by means of a differential 6, namely an axle differential 6. For example, the differential 6 is coupled to the driven shaft 5 on the input side, in particular rigidly and/or permanently, by way of at least one transmission stage 7.

In order to drive the driven shaft 5, the drive device 1 provides a first drive assembly 8, a second drive assembly 9, and a third drive assembly 10. The drive assembly 8 in the exemplary embodiment shown here is configured as an internal combustion engine, whereas the drive assemblies 9 and 10 are present as electric machines. Other configurations of the drive assemblies 8, 9 and 10 may also be realized, however. For example, all three drive assemblies 8, 9 and 10 can be designed as electric machines. The third drive assembly 10 is also purely optional; thus, it can be omitted in a configuration of the drive device 1.

The first drive assembly 8 and the second drive assembly 9 can be coupled to one another by means of an intermediate clutch 11. In a first shift position of the intermediate clutch 11, an operative connection is produced between the first drive assembly and the second drive assembly 9, whereas it is interrupted in a second shift position. It may be provided that the first drive assembly 8 is coupled to the intermediate clutch 11 by way of a vibration absorber 12. The vibration absorber 12 is configured, for example, as a dual mass flywheel or has such a flywheel. Additionally or alternatively, the vibration absorber 12 provides a centrifugal pendulum.

The intermediate clutch 11 is integrated into the vibration absorber 12 in the exemplary embodiment shown here. Further, in the exemplary embodiment shown, the third drive assembly 10 can be coupled rigidly to the first drive assembly 8, in particular permanently, or at least rigidly. Correspondingly, the third drive assembly 10 is arranged on the side of the vibration absorber 12 facing the first drive assembly 8. It follows from this that both the first drive assembly 8 as well as the third drive assembly 10 are coupled to the intermediate clutch 11 or to an input side of the intermediate clutch 11 by way of the vibration absorber 12.

A transmission input shaft 13 is arranged on an output side of the intermediate clutch 11. Preferably, the transmission input shaft 13 is coupled rigidly and/or permanently with the output shaft of the intermediate clutch 11. In other words, the first drive assembly 8 and the (optional) third drive assembly 10 can be placed in operative connection with the transmission input shaft 13 by means of the intermediate clutch 11. The transmission input shaft 13 is present as a common transmission input shaft of a first transmission stage 14 and a second transmission stage 15. In particular, input sides of a first shift clutch 16 and a second shift clutch 17 are each coupled to the transmission input shaft 13, i.e., preferably rigidly and/or permanently.

On the output side, the first shift clutch 16 is coupled to the first transmission stage and the second shift clutch 17 is coupled to the second transmission stage 15, i.e., preferably also rigidly and/or permanently. On their side facing away from the corresponding shift clutch 16 or 17, respectively, the transmission stages 14 and 15 are coupled to a transmission output shaft 18, in particular rigidly and/or permanently. In this regard, the two transmission stages 14 and 15 as well as the two shift clutches 16 and 17 represent, together with the transmission input shaft 13 and the transmission output shaft 18, a dual clutch transmission 19. The transmission output shaft 18 is coupled to the driven shaft 5, preferably rigidly and/or permanently, in particular, by way of another gear transmission stage 20.

Only for the sake of completeness will it be indicated also that the intermediate clutch 11 can be actuated by means of a first actuator 21, the first shift clutch 16 can be actuated by means of a second actuator 22, and the second shift clutch 17 can be actuated by means of a third actuator 23.

It can be clearly derived from the illustration that the second drive assembly 9 is also coupled to the transmission input shaft 13. i.e., preferably by way of a gear transmission stage 24. The ratio of this gear transmission stage 24 is preferably selected as fixed, thus not changeable. It is clear overall that the driven shaft 5 can be driven either by means of the second drive assembly 9, while it is decoupled from the first drive assembly 8 and the third drive assembly 10. Or alternatively, the driving of the driven shaft 5 is possible jointly by means of the first drive assembly 8, the second drive assembly 9, and the third drive assembly 10. As shown here, it can be provided that the drive assemblies 8, 9 and 10 are arranged axis-parallel to one another. This makes possible a particularly efficient configuration of the drive device 1 relative to packing space.

The invention claimed is:

1. A drive device for a motor vehicle, comprising:
   a first drive assembly, a second drive assembly that can be coupled to the first drive assembly with a fixed transmission ratio by an intermediate clutch, as well as a driven shaft that can be coupled to the first drive assembly and to the second drive assembly, wherein the first drive assembly is directly coupled or can be coupled to a third drive assembly, and the driven shaft can be coupled to the second drive assembly, on the one hand, by way of a first shift clutch and a first transmission stage, and, on the other hand, by way of a second shift clutch, which is coupled to the second drive assembly parallel to the first shift clutch, and a second transmission stage so that a dual clutch transmission is realized between the second drive assembly and the driven shaft,
   wherein input sides of the first shift clutch and the second shift clutch are coupled to the second drive assembly, and output sides of the first shift clutch and the second shift clutch are coupled to the driven shaft,
   wherein the output side of the first shift clutch is coupled to the driven shaft via the first transmission stage, and the output side of the second shift clutch is coupled to the driven shaft via the second transmission stage,
   wherein the second drive assembly axially overlaps the first and second shift clutches as well as the first and second transmission stages when viewed longitudinally,
   wherein that the first drive assembly and the intermediate clutch or the intermediate clutch and the second drive assembly are joined together via a vibration absorber, and
   wherein the intermediate clutch is arranged in the radial direction to an axis of rotation of the vibration absorber, and the intermediate clutch is arranged on the inside of the vibration absorber so that the intermediate clutch and the vibration absorber are arranged in an overlapping way when viewed in the axial direction.

2. The drive device according to claim 1, wherein the second drive assembly is coupled to a common transmission input shaft of the first transmission stage and the second transmission stage by way of a gear transmission stage.

3. The drive device according to claim 1, wherein the driven shaft is coupled to a common transmission output shaft of the first transmission stage and the second transmission stage.

4. The drive device according to claim 3, wherein that the driven shaft is coupled to the common transmission output shaft by way of another gear transmission stage.

5. The drive device according to claim 1, wherein the second drive assembly has a rated power of the same order of magnitude as the first drive assembly.

6. The drive device according to claim 1, wherein the third drive assembly has a lower rated power than the second drive assembly.

7. The drive device according to claim 1, wherein the first drive assembly is configured as an internal combustion engine and/or the second drive assembly and/or the third drive assembly is/are configured as an electric machine or machines.

8. The drive device according to claim 1, wherein the first drive assembly and/or the second drive assembly and/or the third drive assembly are arranged axis-parallel to one another.

* * * * *